(12) United States Patent
Mo et al.

(10) Patent No.: US 11,847,777 B1
(45) Date of Patent: Dec. 19, 2023

(54) CORRELATION-BASED OVERLAY KEY CENTERING SYSTEM AND METHOD THEREOF

(71) Applicant: AUROS TECHNOLOGY, INC., Hwaseong-si (KR)

(72) Inventors: Soo-Yeon Mo, Hwaseong-si (KR); Hee-Chul Lim, Hwaseong-si (KR)

(73) Assignee: AUROS TECHNOLOGY, INC., Hwaseong-si (KR)

( * ) Notice: Subject to any disclaimer, the term of this patent is extended or adjusted under 35 U.S.C. 154(b) by 0 days.

(21) Appl. No.: 18/222,660

(22) Filed: Jul. 17, 2023

(30) Foreign Application Priority Data

Nov. 14, 2022 (KR) .................. 10-2022-0151233

(51) Int. Cl.
*G06T 7/00* (2017.01)
*G06T 3/40* (2006.01)
(Continued)

(52) U.S. Cl.
CPC ............. *G06T 7/001* (2013.01); *G06T 3/40* (2013.01); *G06T 7/32* (2017.01); *G06T 7/60* (2013.01);
(Continued)

(58) Field of Classification Search
CPC .. G06T 7/32; G06T 7/33; G06T 7/337; G06T 7/70; G06T 7/73; G06T 7/74;
(Continued)

(56) References Cited

U.S. PATENT DOCUMENTS

| 4,757,550 A | * | 7/1988 | Uga | .................. B23Q 15/22 |
| | | | | 382/148 |
| 2004/0057627 A1 | | 3/2004 | Abe et al. | |

(Continued)

FOREIGN PATENT DOCUMENTS

| JP | 2002-353126 A | 12/2002 |
| KR | 10-0394585 B1 | 8/2003 |

(Continued)

OTHER PUBLICATIONS

Korean Office Action for related KR Application No. 10-2022-0151233 dated Feb. 8, 2023 from Korean Intellectual Property Office.

(Continued)

*Primary Examiner* — Geoffrey E Summers
(74) *Attorney, Agent, or Firm* — Paratus Law Group, PLLC

(57) ABSTRACT

A method of centering a correlation-based overlay includes resizing an overlay target image to a size smaller than an entire image size, defining first and second templates that are symmetrical to each other based on a diagonal in the resized image, and calculating a rough center coordinate by calculating a first correlation value representing a similarity symmetrical with respect to the diagonal between images of the first and second templates; defining first and second templates symmetrical based on a diagonal passing through the rough center coordinates in an original image of the overlay target image, calculating a fine center coordinate of the overlay target image by calculating a second correlation value representing a similarity symmetrical with respect to the diagonal between the images of the first and second templates; and centering an overlay key by moving a stage to a target position based on the fine center coordinates.

16 Claims, 5 Drawing Sheets

(51) Int. Cl.
*G06T 7/32* (2017.01)
*G06T 7/60* (2017.01)
*G06V 10/75* (2022.01)
*G06T 7/73* (2017.01)

(52) U.S. Cl.
CPC ............ *G06T 7/74* (2017.01); *G06V 10/7515* (2022.01); *G06T 2207/20016* (2013.01); *G06T 2207/30148* (2013.01)

(58) Field of Classification Search
CPC . G06T 2207/20016; G06T 2207/30148; G06T 7/001; G06T 7/60; G06T 3/40; G06T 3/4007; G06T 3/4023; G06T 3/4046; G06T 3/4048; G06V 10/7515
See application file for complete search history.

(56) References Cited

U.S. PATENT DOCUMENTS

| | | | |
|---|---|---|---|
| 2008/0023855 A1* | 1/2008 | Ghinovker | ................ G06T 7/33 257/E23.179 |
| 2012/0081712 A1* | 4/2012 | Laengle | ................ G03F 9/7007 356/620 |
| 2012/0207397 A1* | 8/2012 | Nagatomo | ......... G06V 30/2504 382/218 |

FOREIGN PATENT DOCUMENTS

| | | | | |
|---|---|---|---|---|
| KR | 10-2006-0085293 A | 7/2006 | | |
| KR | 10-0904732 B1 | 6/2009 | | |
| KR | 10-2012-0048904 A | 5/2012 | | |
| KR | 10-2015-0111451 A | 10/2015 | | |
| KR | 2015111451 A | * 10/2015 | ......... H01L 21/0272 | |
| KR | 10-1604789 B1 | 3/2016 | | |
| KR | 10-2021-0033907 A | 3/2021 | | |
| KR | 10-2022-0036803 A | 3/2022 | | |

OTHER PUBLICATIONS

Korean Notice of Allowance for related KR Application No. 10-2022-0151233 dated Jun. 1, 2023 from Korean Intellectual Property Office.

* cited by examiner

CORRELATION-BASED OVERLAY KEY CENTERING SYSTEM AND METHOD THEREOF

CROSS-REFERENCE TO PRIOR APPLICATION

This application claims priority to Korean Patent Application No. 10-2022-0151233 (filed on Nov. 14, 2022), which is hereby incorporated by reference in its entirety.

BACKGROUND

The present disclosure relates to a semiconductor process, more particularly, a system for centering a correlation-based overlay key and a method thereof.

In a semiconductor process, a photo resist is coated on a surface of a wafer and light is transferred to the photoresist on the surface of the wafer deposited on a reticle in an exposure process using a stepper, to develop the photo resist after the exposure process. Hence, a circuit pattern is formed on the surface of the wafer in a photolithography process for etching the developed photo resist on the surface of the wafer, using an etching mask. A multilayer film having the circuit pattern is formed on the wafer surface by repeating the photolithography process, thereby manufacturing a semiconductor device.

In the exposure process of the semiconductor process that is performed to form a fine pattern on a semiconductor substrate, a photoresist is coated on a semiconductor substrate. While applying heat to the semiconductor substrate having the photoresist coated thereon, a pattern formed on a mask is matched to a pattern on a surface of the semiconductor substrate. After that, the photoresist of a predetermined area is exposed by partially transmitting light. After the exposure process, a developing solution is sprayed to remove the light-transmitted area or the light-not-transmitted area by using chemical action during the exposure. Then, a pattern is formed on the semiconductor substrate and an alignment state is measured to measure a degree of vertical alignment.

On the other hand, the degree of vertical alignment of an upper thin film layer and a lower thin film layer is called overlay to make a semiconductor chip on the wafer. An optical overlay measurement device inspect the alignment state of a pattern formed on a semiconductor substrate and a pattern formed in the current process, using an overlay key to detect a minute detect and a defect in a semiconductor process.

The overlay process performed to measure and inspect the alignment state of fine patterns of the semiconductor substrate may use an overlay mark to check whether the upper thin layer pattern and the lower thin layer pattern formed on the multilayer thin layer configured of multi-layers on the semiconductor substrate are aligned precisely, that is, to check the alignment state of the upper thin layer and the lower thin layer.

The optical overlay measurement device is an ultra-high precision measurement in the semiconductor process that uses the overlay mask to check whether the lower thin film layer pattern and the upper thin film layer pattern and the upper thin film layer pattern formed on the thin film multi-layers are accurately aligned on the multilayered semiconductor substrate and how well the circuit pattern is aligned by using the overlay mark.

To measure the degree of the alignment of the overlay mark, a PR (Pattern Recognition) action has to be preceded.

When moving a stage to the position of the overlay key input in a recipe, there is a limit to fining the exact location due to the repeatability of the hardware (e.g., a robot, a state, etc.).

The PR action is a technology that corrects that. The matching position between a model image registered in the recipe and a live image on a FOV (Field of View) is detected as a center to additionally move a state as much as offset.

However, the method of performing the additional stage move by 1:1 matching between images may be possible when the image registered in the recipe can represent the images of all targets across the wafer.

A PR fail might occur when variations between the overlay key images are severe due to the effect of the process.

Accordingly, a technique for finding center coordinates of an overlay key and accurately centering the overlay key by correcting and supplementing the PR fail is required.

Prior Art

Cited paten document
Korean Registered Patent No. KR 10-1604789 (Mar. 13, 2016)

SUMMARY

Accordingly, one objective of the present disclosure is invented to solve the above-noted disadvantages of the prior art, and to provide a correlation-based overlay key centering system to overcome variations between overlay key images due to process effects and perform PR (Pattern Recognition), and a method thereof.

Objects of the present invention are not limited to the above-described objects, and other objects and advantages of the present invention will be understood by the following description and will be more definitely understood through the embodiments of the present invention. It is also to be easily understood that the objectives and advantages of the present invention may be realized and attained by means and a combination thereof described in the appended claims.

A correlation-based overlay key centering system according to an embodiment may include an overlay measurement device comprising at least one processor, and inspecting an alignment state of a lower thin film layer pattern and an upper thin film layer pattern using an overlay target image. wherein the at least one processor is configured to: receives the overlay target image, resizes the overlay target image to a size smaller than an entire image size, define a first template and a second template that are symmetrical to each other based on a diagonal in the resized image, calculates a rough center coordinate by calculating a first correlation value representing a similarity symmetrical with respect to the diagonal between an image of the first template and an image of the second template, defines a first template and a second template symmetrical based on a diagonal passing through the rough center coordinates in an original image of the overlay target image, calculate a fine center coordinate of the overlay target image by calculating a second correlation value representing a similarity symmetrical with respect to the diagonal between the image of the first template and the image of the second template, and centers an overlay key by moving a stage to a target position based on the fine center coordinates.

A method of centering a correlation-based overlay according to an embodiment may include a rough search step of resizing an overlay target image to inspect an alignment state of a lower thin film layer pattern and an upper thin film layer pattern to a size smaller than an entire image size, defining a first template and a second template that are symmetrical to each other based on a diagonal in the resized image, and calculating a rough center coordinate by calculating a first correlation value representing a similarity symmetrical with respect to the diagonal between an image of the first template and an image of the second template; a fine search step of defining a first template and a second template symmetrical based on a diagonal passing through the rough center coordinates in an original image of the overlay target image, calculating a fine center coordinate of the overlay target image by calculating a second correlation value representing a similarity symmetrical with respect to the diagonal between the image of the first template and the image of the second template; and centering an overlay key by moving a stage to a target position based on the fine center coordinates.

The present disclosure may precisely center the overlay key based on deep learning, thereby precisely measuring and examining the alignment state of the fine patterns of the semiconductor substrate. In addition, the present disclosure may improve the precision of the overlay measurement by precisely searching the coordinates of the overlay key pattern.

In addition, the present disclosure may prevent PR (Pattern Recognition) failure that might occur when variation for each overlay key is severe.

In addition, the present disclosure may compensate for PR misleading that might occur on a layer sensitively reacting to a PR parameter.

In addition to the above-described effects, specific effects of the present invention will be described together with the following detailed description for implementing the present invention.

DETAILED DESCRIPTION

Figure 1:
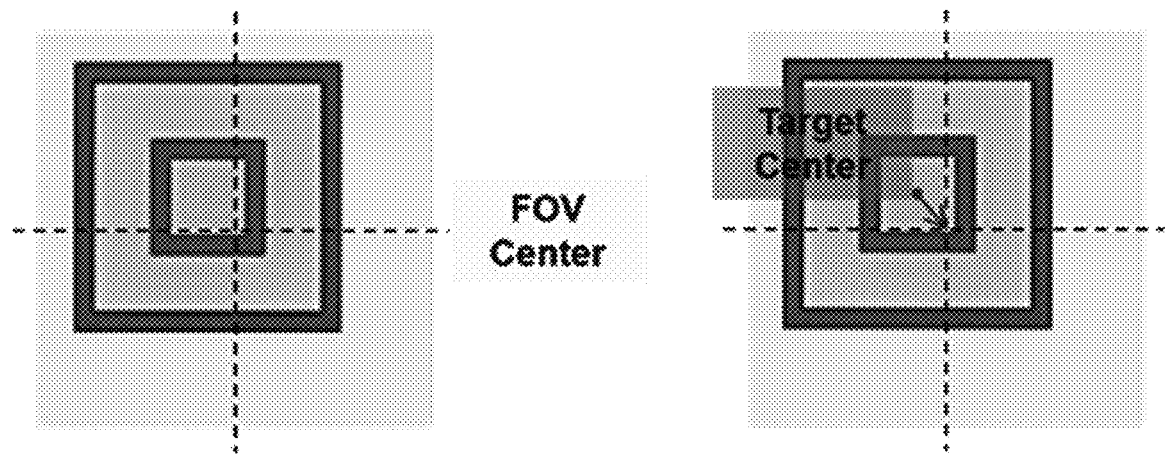
FIG. 1 is a view to describe a PR (Pattern Recognition) action.

The above objects, features and advantages will be described later in detail with reference to the accompanying drawings, and accordingly, those skilled in the art to which the present invention belongs will be able to easily implement the technical idea of the present invention. In describing the present invention, if it is determined that the detailed description of the known technology related to the present invention may unnecessarily obscure the subject matter of the present invention, the detailed description will be omitted. Hereinafter, preferred embodiments according to the present invention will be described in detail with reference to the accompanying drawings. In the drawings, the same reference numerals are used to indicate the same or similar components.

Hereinafter, a correlation-based overlay key centering system to overcome variations between overlay key images that occur due to effects of process and perform PR (Pattern Recognition), and a method thereof.

Before describing a method of centering a correlation-based overlay key according to an embodiment, terminology used in the description will be defined.

Over the description, the overlay may be defined as a degree of vertical alignment of an upper thin film layer and a lower thin film layer in order to make a semiconductor chip on a wafer.

Over the description below, an overlay key may be defined as being used to detect minute defects and defects in a semiconductor process by examining an alignment state of a patter formed on a semiconductor substrate and a pattern formed on a current process through an optical overlay measurement device.

In the description, PRU may be defined as centering an overlay key within FOV (Field of View).

In the description, a target finder may be implemented in a PC terminal in which a processor is mounted, that is, an overlay measurement device. As one example, the target finder may be an application configured to calculate a center coordinate of an overlay key based on correlation.

FIG. 1 is a view to describe a PR (Pattern Recognition) action.

When moving a stage to an overlay key position, there is a limit to searching the exact location due to repeatability of hardware (e.g., a robot, a stage, etc.).

A PR action is a technique for correcting the location, which additionally moves the stage as much as offset by detecting a location where a model image registered in a recipe and a live image on the FOV match as the center.

However, the method of performing the additional stage move by 1:1 matching between images may be possible when the image registered in the recipe can represent the images of all targets across the wafer.

A PR fail might occur when variations between the overlay key images are severe due to the effect of the process.

To solve such disadvantages, this embodiment uses an object detection technique to find the location and type of an object within an image. Features of an object to be detected are extracted in advance and trained to create a deep learning model. The corresponding features are detected within a given image and a center position of the overlay key is detected using the deep learning model.

To make a semiconductor chip on a wafer, a degree of vertical alignment of an upper thin film layer and a lower thin film layer may be called the overlay. An optical overlay measurement device may be configured to detect fine defects and semiconductor process detects by using an overlay key in examining an alignment state of a pattern formed on a semiconductor substrate and a pattern formed in a current process.

A correlation-based overlay key centering system according to an embodiment and a method thereof may measure similarity by using a tool that may measures how similar an input function and a target function are. As one example, when the system is used for images, a correlation value may be derived using a tool that measures how similar two images are.

Correlation analysis, which is used in probability theory and statistics, is a method of analyzing a linear relation between two variables. At this time, the strength of the relationship between the two variables is called a correlation or correlation coefficient.

There are several techniques for statistical correlation analysis such as Pearson Correlation Coefficient analysis and Spearman Correlation Coefficient analysis.

In an embodiment, a template matching function may be used to search a portion of an input image that matches a small-sized template image.

The template matching principle scans a template by comparing the template with all portions from an upper left corner of the input image to a lower right corner.

The template matching function may include various template matching functions based on a method of showing a correlation value.

Figure 2:
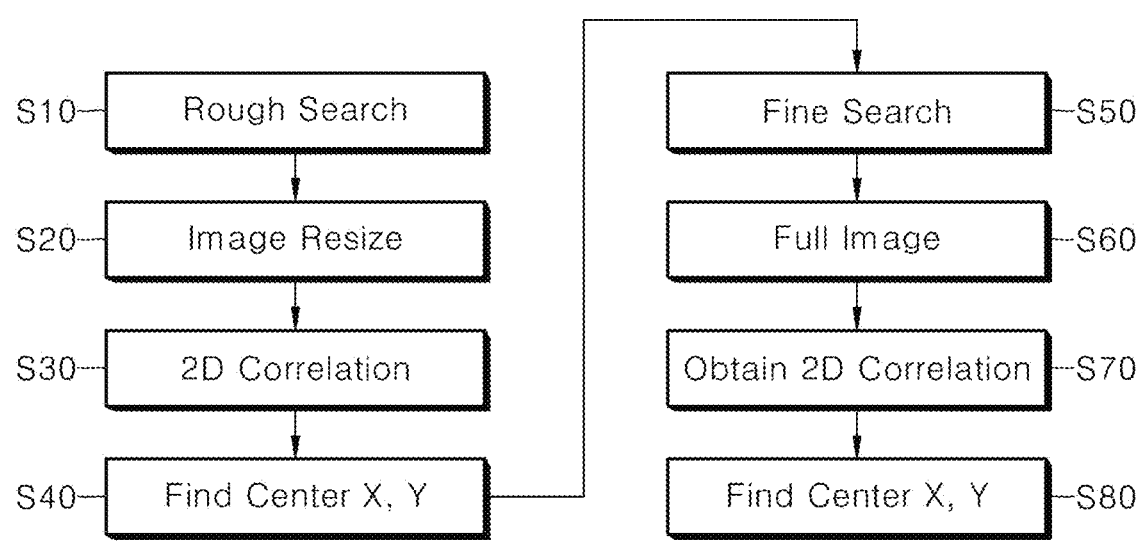
FIG. 2 is a flow chart of a correlation-based overlay key centering system and a method thereof according to an embodiment.

FIG. 2 is a flow chart of a correlation-based overlay key centering system and a method thereof according to an embodiment.

Referring to FIG. 2, a method of centering a correlation-based overlay key may include a rough search step S10 and a fine sear search step S50.

First, the rough search step S10 may modify (or resize) an overlay target image by a preset size and calculate a first correlation value from the modified to calculate a rough center coordinate.

The rough search step S10 will be described in detail as follows.

An overlay target image may be resized to a preset size (S20). As one example, a target finder may receive an overlay target image from a measurement device and reduce the size of the overlay target image by ½, which may minimize the template matching function processing time. Here, the target finder may be a computing terminal that includes an application or a processor configured to compute a center coordinate of an overlay key based on a correlation.

Hence, a first template, a second template and a first correlation search region may be defined in the resized image, and compute first correlation values between the first template and the second template in the first correlation search region (S30).

Figure 3:
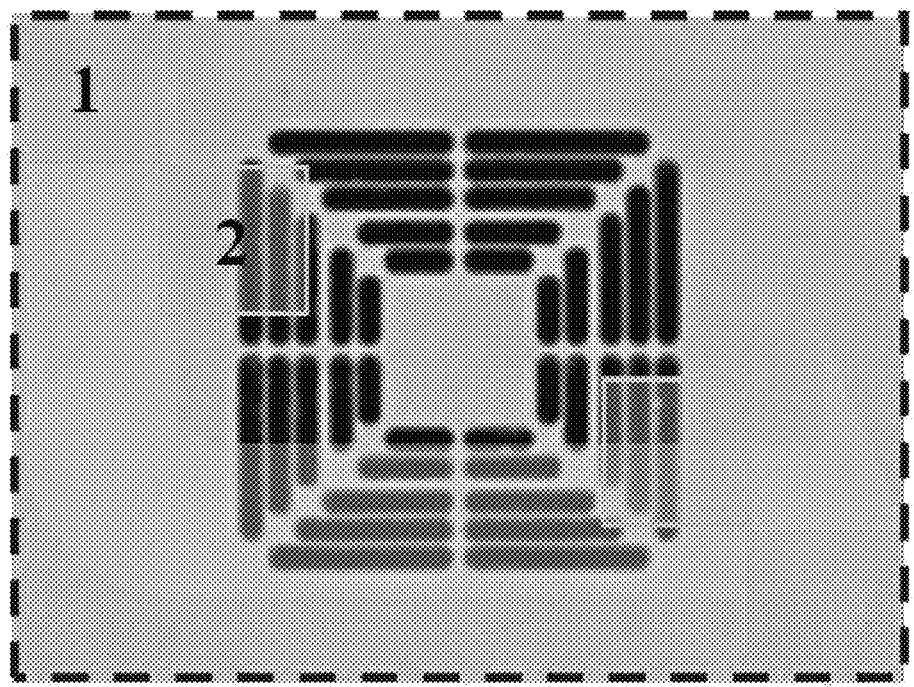
FIGS. 3 to 5 are views showing a correlation search region of FIG. 2.
Figure 4:
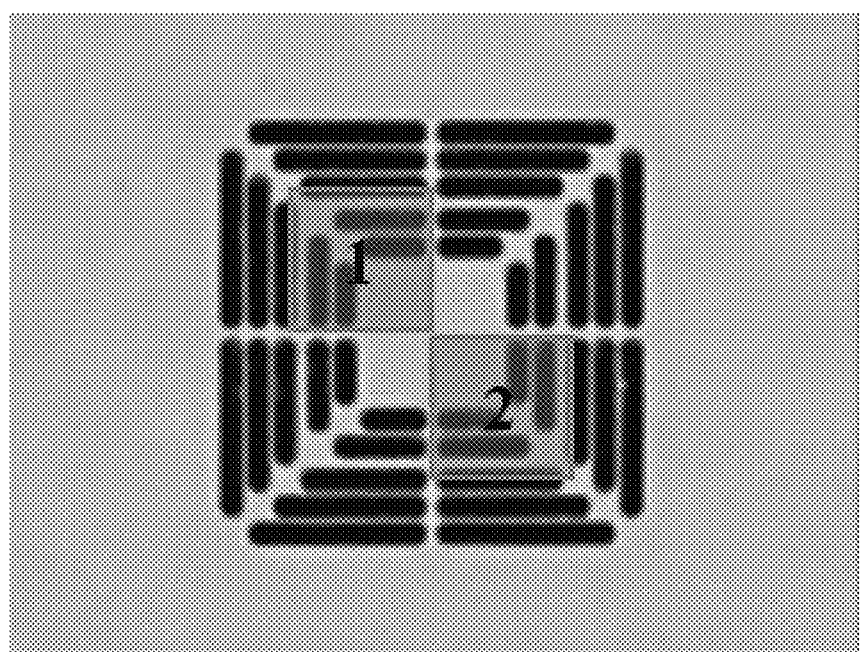
Figure 5:
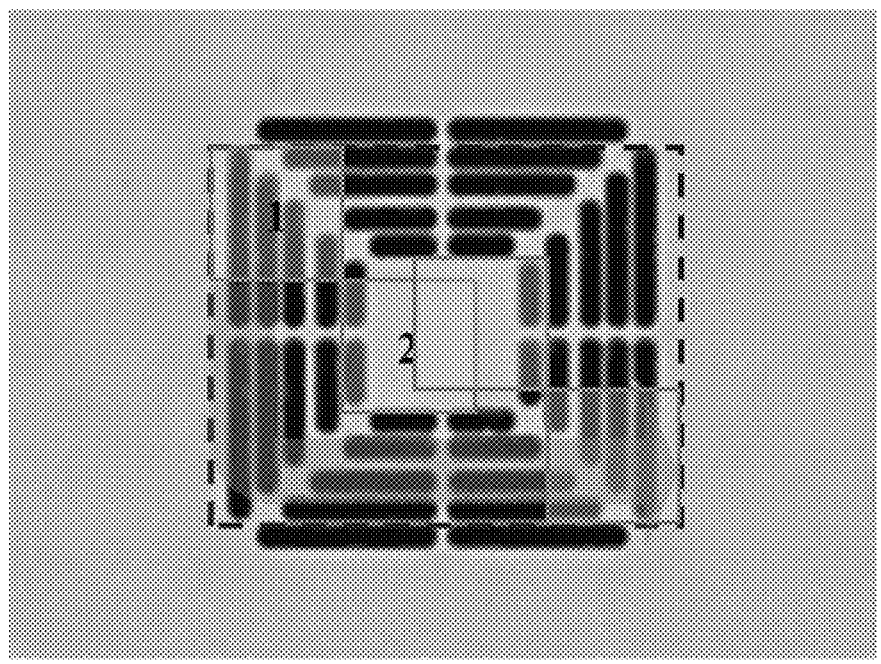

FIGS. 3 to 5 are views showing a correlation search region of FIG. 2.

Referring to FIGS. 3 to 5, for example, the first correlation search region may be defined as an entire region of the resized image.

The first template 1 and the second template 2 may be defined to have horizontal and vertical values of preset sizes while being symmetrical to each other with respect to a diagonal line.

As one example, in an embodiment, an image of the first template 1 and an image of the second template 2 may be compared with 180 rotated images, and similarity may be represented as a correlation value. As another example, the image obtained by inverting the image of the first template with respect to a diagonal between the first template 1 and the second template 2 may be compared with the image of the second template 2, and the similarity between the two may be represented as a correlation value based on the result of the comparison.

In an embodiment, the higher is the similarity between the first template 1 and the second template 2, the higher is the correlation value.

Figure 6:
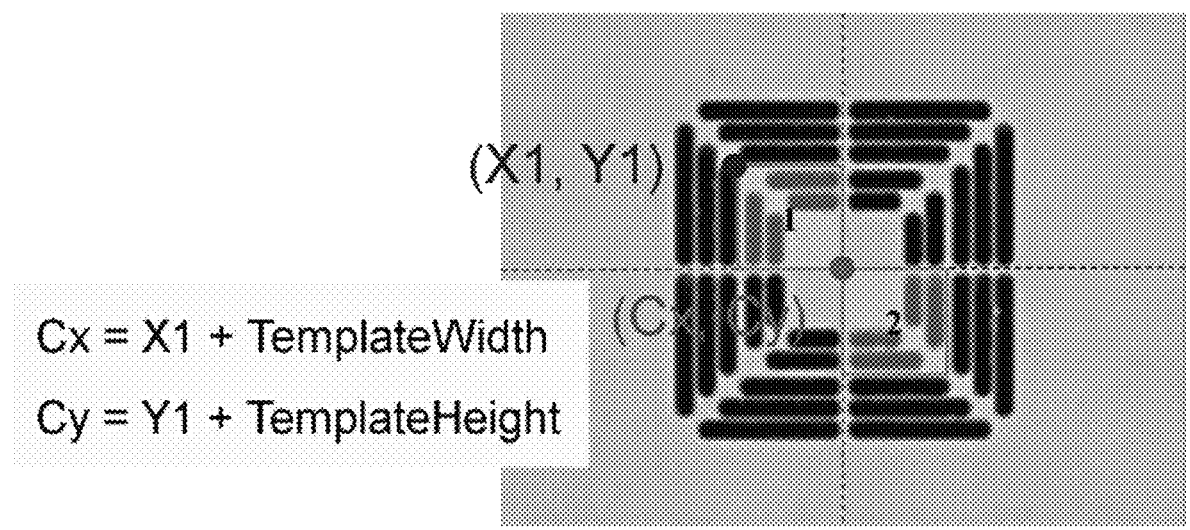
FIG. 6 is a view showing a method of searing the center of the correlation-based overlay key of FIG. 2.

FIG. 6 is a view showing a method of searing the center of the correlation-based overlay key shown in FIG. 2.

Referring to FIGS. 2 and 6, a rough center coordinate may be calculated based on the first correlation values of the first template 1 and the second template 2 within the entire region of the resized image (S30).

The calculation of the rough center coordinate will be described in detail. The first template 1 and the second template 2, which correspond to the largest correlation value among the first correlation values may be searched. Rough center coordinates Cz and Cy may be calculated based on coordinates X1 and Y1 of the first template and the second template 2.

As one example, the rough center coordinate Cx may be calculated as X1+the template horizontal length (or width), and the rough center coordinate Cy may be calculated as Y1+the template vertical length (or height).

Hence, the fine search step S50 may calculate a second correlation value from an original image of the overlay target image with respect to the rough center coordinate to calculate a fine center coordinate.

The fine search step will be described as follows.

The fine search step may define a second correlation search region with respect to the rough center coordinate (S60).

Figure 7:
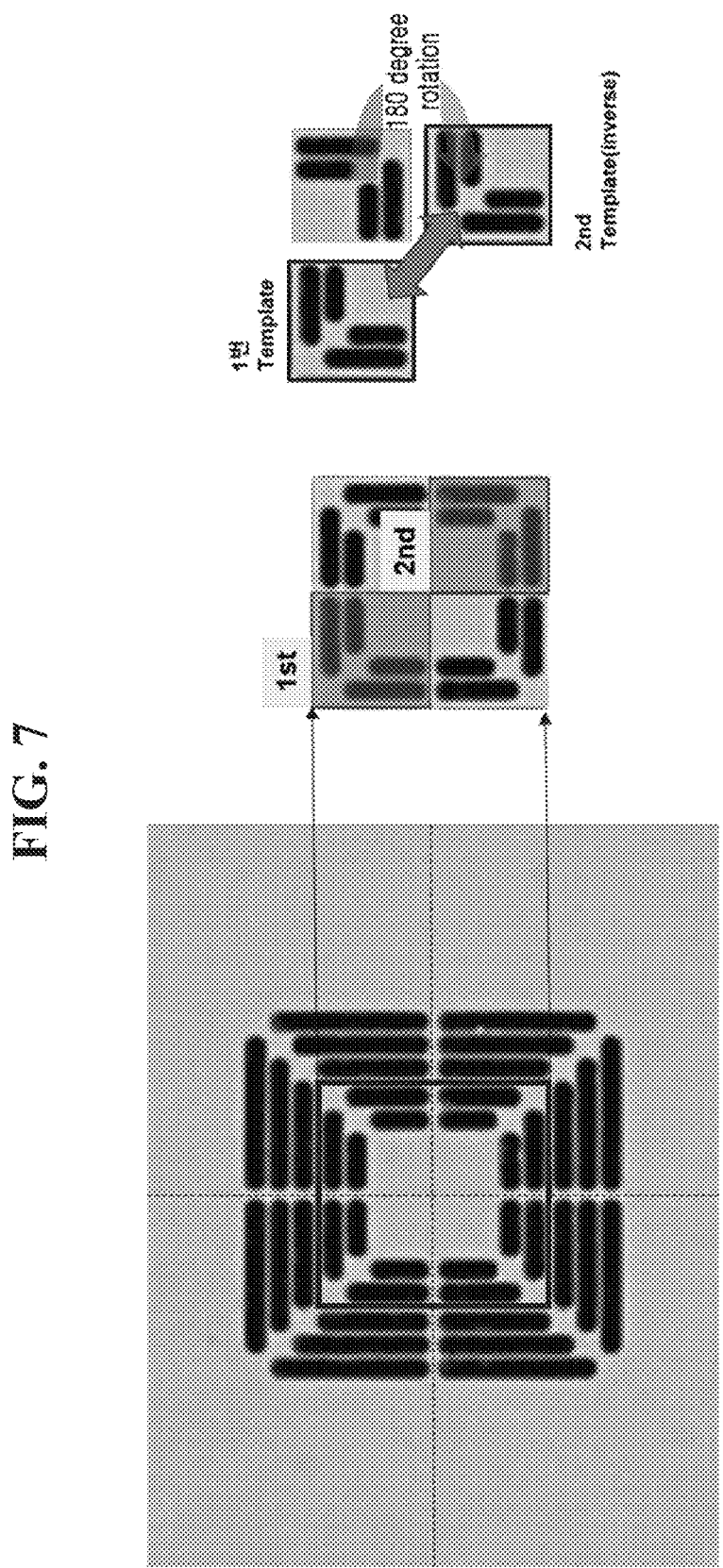
FIG. 7 is a view showing definition of a template for calculating the correlation of FIG. 2.

FIG. 7 is a view showing definition of a template for calculating the correlation of FIG. 2.

Referring to FIG. 7, the second correlation search region may be defined with respect to the rough center coordinate in the original image. As one example, the second correlation search region may be defined to have a value that is twice the width and height of the first template or the second template with respect to the rough center coordinate.

The first template region and the second template region may be defined based on the rough center coordinate in the original image. For example, the first template and the second template may be defined in the regions that are symmetrical to each other with respect to a diagonal passing the rough center coordinate.

Then, the second correlation values of the first template and the second template within the second correlation search region of the original image may be calculated (S70). For example, a second correlation value based on the degree of similarity may be calculated by comparing the image of the first template 1 with a 180° rotated image of the second template 2.

After that, the fine center coordinate may be calculated based on the second correlation values (S80).

The process of calculating the fine center coordinate may fine the first template and the second template that correspond to the largest correlation value among the second correlation values, and calculate the fine center coordinate based on the found first or second template coordinate.

Figure 8:
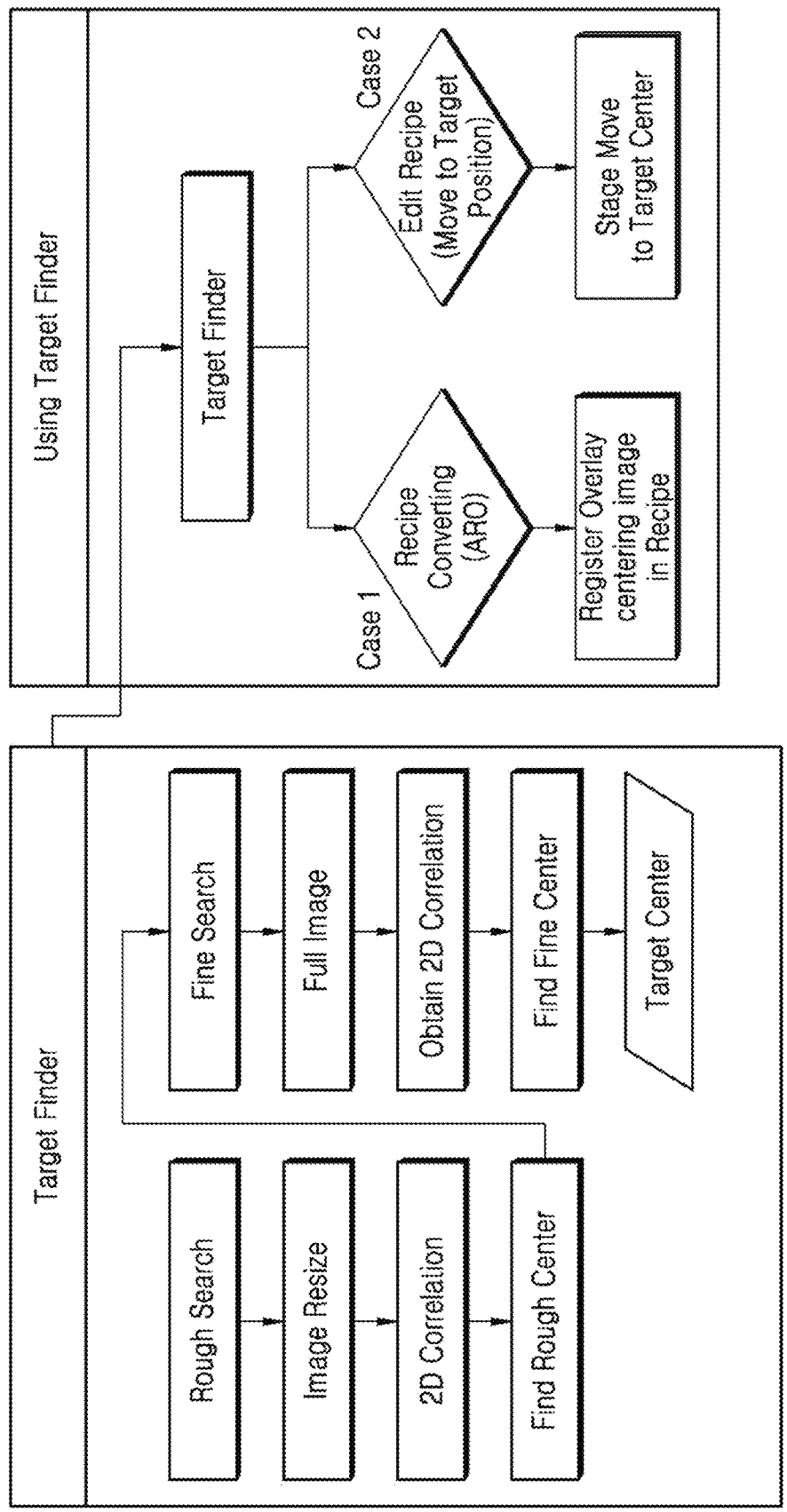
FIG. 8 is a flow chart of a method of centering a correlation-based overlay key.

FIG. 8 is a flow chart of a method of centering a correlation-based overlay key.

Referring to FIG. 8, the target finder may calculate the rough center coordinate through the rough search step, and calculate the fine center coordinate through the fine search step.

The rough search step may reduce the entire image size to minimize the processing time. As one example, the entire image may be resized to ½ size or ¼ size. However, the present disclosure is not limited thereto and the size may be modified in various embodiments within the technical feature of minimizing the processing time of calculating the center coordinate.

The first template 1 and the second template 2 may be defined as shown in FIG. 5. The entire region of the resized image may be defined as a first correlation search region.

A correlation value between the first template and the second template within the first correlation search region may be calculated. One template having the largest correlation value may be searched and the rough center coordinate may be calculated based on the searched template.

A second correlation region may be defined based on the rough center coordinate searched during the fine center coordinate rough search process. A correlation value between the first template and the second template within the second correlation region of the original image may be calculated.

The template having the largest correlation value may be searched and used in calculating the fine center coordinate.

As one example, an overlay measurement device may include a target finder configured to register the calculated fine center coordinate in a recipe or move a stage to a target center based on the fine center coordinate registered recipe. At this time, the overlay measurement device may register PRU image in the recipe by using the target finder. The overlay measurement device may move a stage to a target center during EditRecipe based on the target finder.

The correlation-based overlay key centering system according to an embodiment may include an overlay measurement device including at least one processor. The at least one processor may receive an overlay target image and resize the overlay target image to a smaller size than the entire image and calculate a first correlation value from the resized image to calculate a rough center coordinate based on the first correlation value. The processor may calculate a second correlation value from the original image of the overlay target image based on the rough center coordinate to calculate a fine center coordinate.

When the processor calculates the rough center coordinate in the overlay measurement device, the processor may modify (or resize) the overlay target image to a preset size and define the first template, the second template and the first correlation search region in the resized image. Also, the processor may calculate first correlation values between the first template and the second template within the first correlation search region, and calculate the rough center coordinate based on the first correlation values.

The first correlation search region may be defined as the entire region of the resized image. The first template and the second template may be defined to be symmetrical to each other with respect to a diagonal, while having predetermined horizontal values (width values) and vertical values (height values).

The processor may search a first template and a second template which correspond to the largest value among the first correlation values, and calculate the rough center coordinate based on the searched first or second template coordinate.

When calculating the fine center coordinate, the processor may define a second correlation search region based on the rough center coordinate, and calculate second correlation values of the first template and the second template within the second correlation search region of the original image in order to calculate a fine center coordinate based on the second correlation values.

The processor may search a first template and a second template corresponding to the largest correlation value among the second correlation values, and calculate the fine center coordinate based on the first or second template coordinate.

The overlay measurement device may register an image of an overlay key centered based on the fine center coordinate in the recipe.

A method of centering a correlation-based overlay key according to an embodiment may include a rough search step of modifying an overlay target image to a preset size and calculate a rough center coordinate by calculating a correlation value from the resized image; and a fine search step of calculating a fine center coordinate by calculating a correlation value based on the rough center coordinate.

The rough search step may include a step of modifying the overlay target image to a predetermined size; a step of defining a first template, a second template and a first correlation search region in the resized image; a step of calculating first correlation values between the first template and the second template in the first correlation search region; and a step of calculating a rough center coordinate based on the first correlation values.

The first correlation search region may be defined as the entire region of the resized image.

The first template and the second template may be defined to be symmetrical to each other with respect to a diagonal, while having a predetermined size of a horizontal value (width value) and a predetermined size of a vertical value (length value).

The step of calculating the rough center coordinate may include a step of searching a first template and a second template corresponding to the largest correlation value among the first correlation values; and a step of calculating the rough center coordinate based on the coordinate of the first or second template.

The fine search step may include a step of defining a second correlation search region with respect to the rough center coordinate; a step of calculating second correlation values of the first template and the second template within the second correlation search region from an original image; and a step of calculating the fine center coordinate based on the second correlation values.

The step of calculating the fine center coordinate may include a step of searching a first template and a second template corresponding to the largest correlation value among the second correlation values; and a step of calculating the fine center coordinate based on the coordinate of the first or second template.

The method of centering the correlation-based overlay key may further include a step of registering an image of an overlay key centered based on the fine center coordinate in a recipe.

The method of centering the correlation-based overlay key may further include a step of centering the overlay key by moving a stage to a target position based on the fine center coordinate.

According to the embodiments, the overlay key may be precisely centered based on the correlation, thereby precisely measuring and examining the alignment state of the fine patterns of the semiconductor substrate.

In addition, the center coordinate of the overlay key pattern may be precisely searched, thereby improving precision of the semiconductor process.

In addition, the method of centering the deep learning-based overlay key may prevent PR (Pattern Recognition) failure that might occur when variation for each overlay key is severe.

In addition, the method of centering the deep learning-based overlay key may compensate for PR misleading that might occur on a layer sensitively reacting to a PR parameter.

Although the present invention has been described with reference to the exemplified drawings, it is to be understood that the present invention is not limited to the embodiments and drawings disclosed in this specification, and those skilled in the art will appreciate that various modifications are possible without departing from the scope and spirit of the present invention. Further, although the operating effects according to the configuration of the present invention are not explicitly described while describing an embodiment of the present invention, it should be appreciated that predictable effects are also to be recognized by the configuration.

The invention claimed is:

1. A correlation-based overlay centering system comprising:
an overlay measurement device comprising at least one processor, and inspecting an alignment state of a lower thin film layer pattern and an upper thin film layer pattern using an overlay target image, wherein the at least one processor is configured to:
receive the overlay target image,
resize the overlay target image to a size smaller than an entire image size,
define a first template and a second template that are symmetrical to each other based on a first diagonal in the resized image,
calculate a rough center coordinate by calculating a first correlation value representing a similarity symmetrical with respect to the first diagonal between an image of the first template and an image of the second template,
define a third template and a fourth template symmetrical based on a second diagonal passing through the rough center coordinate in an original image of the overlay target image,
calculate a fine center coordinate of the overlay target image by calculating a second correlation value representing a similarity symmetrical with respect to the second diagonal between an image of the third template and an image of the fourth template, and
center an overlay key by moving a stage to a target position based on the fine center coordinate.

2. The correlation-based overlay centering system of claim 1, wherein when calculating the rough center coordinate, the processor further defines a first correlation search region, and calculates the first correlation value between the image of the first template and the image of the second template in the first correlation search region.

3. The correlation-based overlay centering system of claim 2, wherein the first correlation search region is defined as an entire region of the resized image.

4. The correlation-based overlay centering system of claim 3, wherein the first template and the second template have predetermined sizes of horizontal and vertical values.

5. The correlation-based overlay centering system of claim 2, wherein the processor searches a first template position and a second template position that correspond to a largest correlation value, and calculates the rough center coordinate by using a coordinate of the searched first template position and second template position.

6. The correlation-based overlay centering system of claim 1, wherein when calculating the fine center coordinate, the processor further defines a second correlation search region with respect to the rough center coordinate in the original image, and calculates the second correlation value between the image of the third template and the image of the fourth template in the second correlation search region.

7. The correlation-based overlay centering system of claim 6, wherein the processor searches a third template position and a fourth template position that correspond to a largest correlation value, and calculates the fine center coordinate by using a coordinate of the searched third template position and the fourth template position.

8. The correlation-based overlay centering system of claim 1, wherein the processor registers an image of the overlay key centered based on the fine center coordinate in a recipe.

9. A method of centering a correlation-based overlay comprising:
resizing an overlay target image to inspect an alignment state of a lower thin film layer pattern and an upper thin film layer pattern to a size smaller than an entire image size;
defining a first template and a second template that are symmetrical to each other based on a first diagonal in the resized image, and image;
calculating a rough center coordinate by calculating a first correlation value representing a similarity symmetrical with respect to the first diagonal between an image of the first template and an image of the second template;
defining a third template and a fourth template symmetrical based on a second diagonal passing through the rough center coordinate in an original image of the overlay target image;
calculating a fine center coordinate of the overlay target image by calculating a second correlation value representing a similarity symmetrical with respect to the second diagonal between an image of the third template and an image of the fourth template; and
centering an overlay key by moving a stage to a target position based on the fine center coordinate.

10. The method of method of centering the correlation-based overlay of claim 9, wherein the calculating the rough center coordinate further comprises:
defining a first correlation search region in the resized image; and
calculating the first correlation value between the image of the first template and the image of the second template in the first correlation search region.

11. The method of method of centering the correlation-based overlay of claim 10, wherein the first correlation search region is defined as an entire region of the resized image.

12. The method of method of centering the correlation-based overlay of claim 10, wherein the calculating the rough center coordinate comprises:
searching a first template position and a second template position that correspond to a largest correlation value; and
calculating the rough center coordinate by using a coordinate of the searched first template position and second template position.

13. The method of method of centering the correlation-based overlay of claim 9, wherein the first template and the second template have predetermined sizes of horizontal and vertical values.

14. The method of method of centering the correlation-based overlay of claim 9, wherein the calculating the fine center coordinate further comprises:
defining a second correlation search region with respect to the rough center coordinate in the original image; and
calculating the second correlation value between the image of the third template and the image of the fourth template in the second correlation search region.

15. The method of method of centering the correlation-based overlay of claim 14, wherein the calculating the fine center coordinate comprises:

searching a first template position and a second template position that correspond to a largest value; and calculating the fine center coordinate by using a coordinate of the searched third template position and the fourth template position.

16. The method of method of centering the correlation-based overlay of claim 9, further comprising:

registering an image of the overlay key centered based on the fine center coordinate in a recipe.

* * * * *